(12) United States Patent
Crow et al.

(10) Patent No.: US 6,493,077 B1
(45) Date of Patent: Dec. 10, 2002

(54) OPTICAL TEST PROBE FOR SILICON OPTICAL BENCH

(75) Inventors: John D. Crow, Mount Kisco, NY (US); Petar Pepeljugoski, Tarrytown, NY (US); Jeremy D. Schaub, Pecksville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/906,358

(22) Filed: Jul. 16, 2001

(51) Int. Cl.[7] .............................................. G01N 21/00
(52) U.S. Cl. ................................ 356/239.2; 250/227.14
(58) Field of Search .......................... 356/239.2, 239.8, 356/237.1, 72; 250/227.14, 227.18, 227.22, 227.23; 324/244.1, 245, 246, 501

(56) References Cited

U.S. PATENT DOCUMENTS 4,808,815 A * 2/1989 Langley ................. 250/227.28

* cited by examiner

Primary Examiner—Que T. Le
(74) Attorney, Agent, or Firm—F. Chau & Associates, LLP

(57) ABSTRACT

An optical testing device includes an optical fiber having a first numerical aperture at a first end of the optical fiber. A positioning structure is attached to the optical fiber for moving the first end of the optical fiber to any portion of a substrate for testing an optical device. The optical device may be disposed at any location on the substrate and provides a light beam with an emission angle less than the first numerical aperture. A test head collects the light beam through the optical fiber to test the optical device. A method for positioning the optical fiber and testing the optical device is also disclosed.

26 Claims, 6 Drawing Sheets

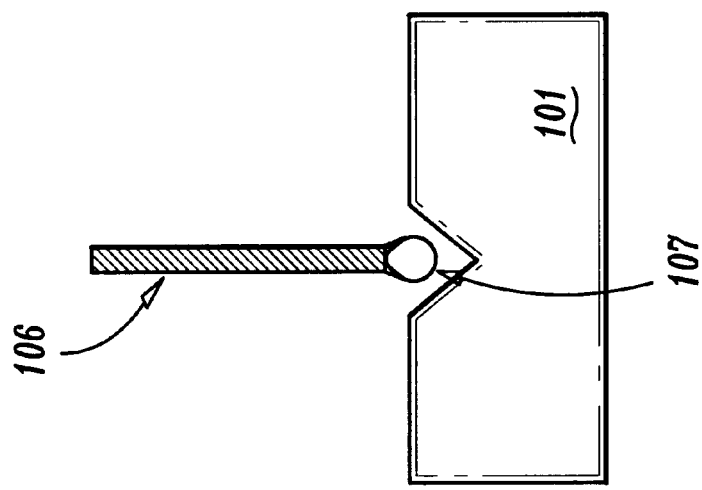
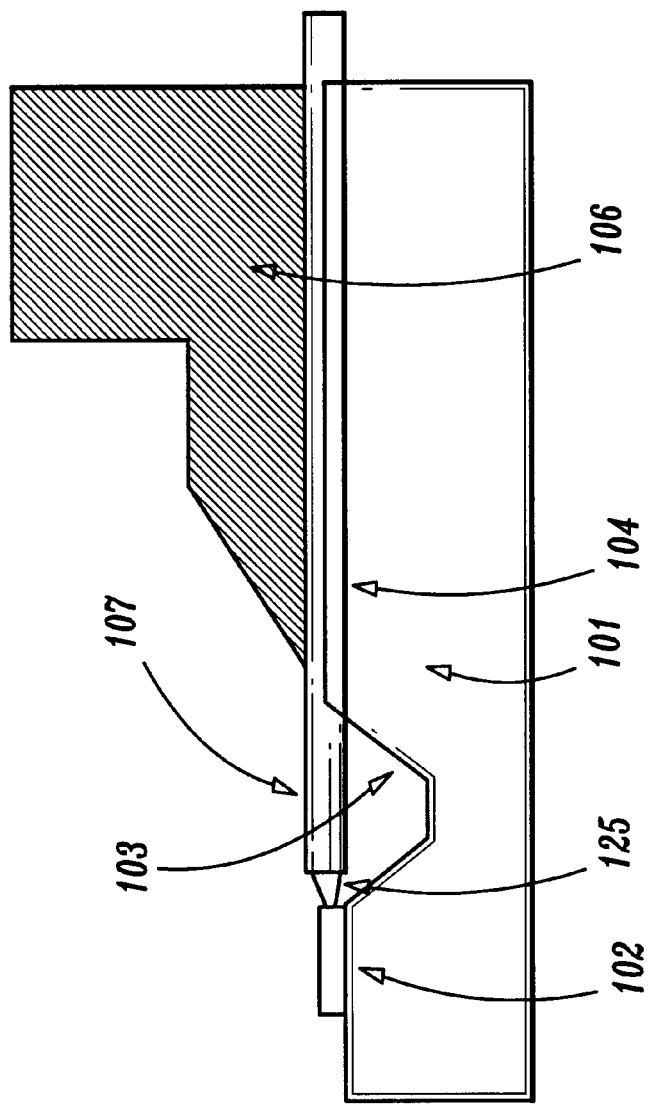
FIG. 3
FIG. 4

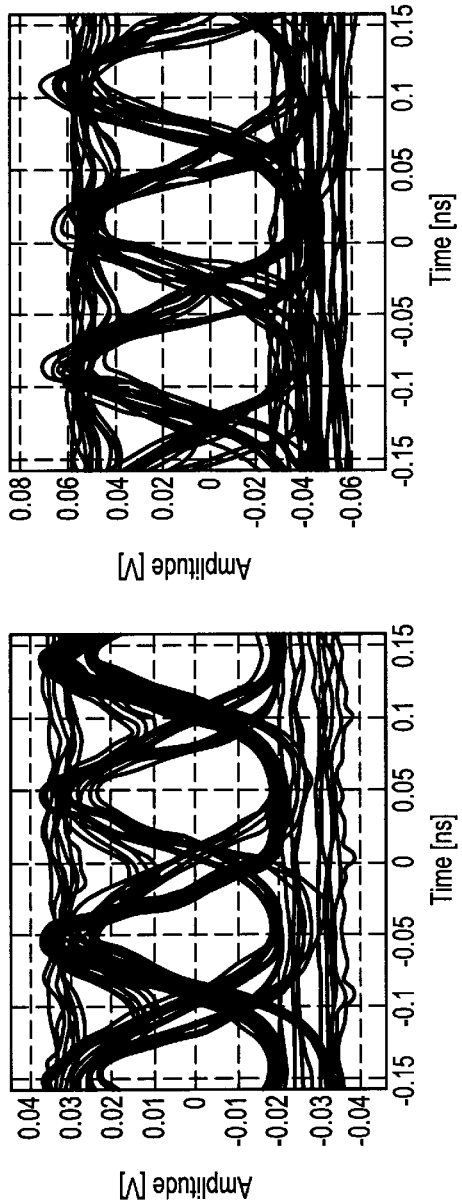
FIG. 7A Input Pulse at 0 meters
FIG. 7B Output Pulse at 10 meters
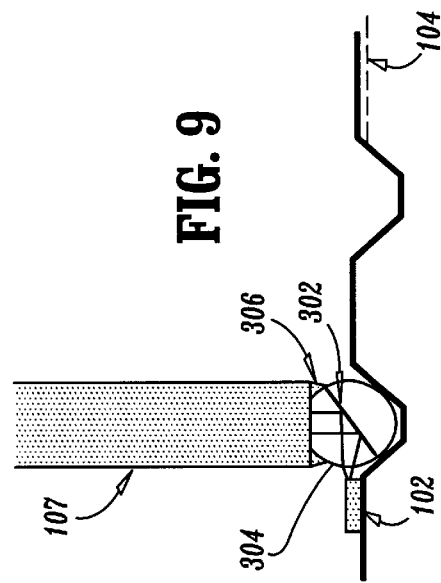
FIG. 9
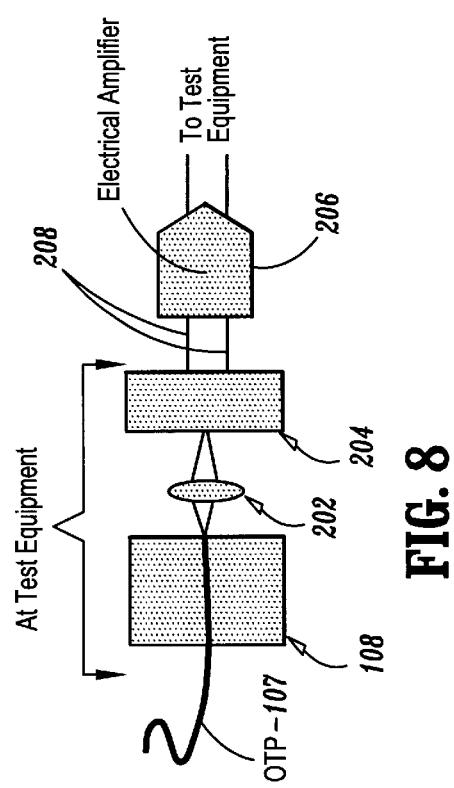
FIG. 8

OPTICAL TEST PROBE FOR SILICON OPTICAL BENCH

BACKGROUND OF THE INVENTION

1. Field of the Invention

The present invention relates to optical communication devices, and more particularly to a test probe which permit fast and efficient testings of optical devices, preferably when mounted upon silicon optical benches.

2. Description of the Related Art

In the optical data communications industry, optical component subassemblies for the optical link transmitter and receiver modules employ a multi-component carrier made from silicon. This carrier is called a Silicon Optical Bench (SiOB). The SiOB has etched features in the silicon for aligning optical passive components, and high speed electrical traces on the silicon for contacting optoelectronic (OE) chips on the carrier.

SiOB designs have only put the optoelectronic chip and a single passive optical component on the SiOB.

Referring to FIG. 1, a typical SiOB 10 is shown, where a laser diode (LD) 12 is be placed near the edge of a large socket 14 in the SiOB 10. The socket is there to align a lens (not shown) in front of LD 12, but it also permits the optical beam to emit from the SiOB 10 without hitting the SiOB surfaces.

After the laser diode 12 is placed on this SiOB 10, a large area photodetector (not shown) is brought up near the edge 16 of the SiOB in front of the LD 12 and a DC light output measurement is made. Then, a communication single-mode fiber is brought near the LD output, and a small portion of the light is collected for an AC measurement. This testing methodology requires access to the area directly in front of the LD and multiple alignments of test fixtures.

These SiOB designs are limited as to where optical devices can be placed or attached thereon since access is needed to these devices for testing.

During the assembly of this type of SiOB, the OE chip (LD, etc.) is usually the first component to be attached, and it must have AC and DC tests made prior to assembling all the other components on the SiOB. This testing must be accurate and done rapidly to keep manufacturing throughput high and manufacturing cost low.

Therefore, a need exists for testing optical devices, such as, lasers in-situ, which permits placement of such devices anywhere on a SiOB. A further need exists for a test probe which permits accurate and rapid testing of optical devices to keep manufacturing throughput high and manufacturing cost low.

SUMMARY OF THE INVENTION

An optical testing device includes an optical fiber having a first numerical aperture at a first end of the optical fiber. A positioning structure is attached to the optical fiber for moving the first end of the optical fiber to any portion of a substrate for testing an optical device. The optical device may be disposed at any location on the substrate and provides a light beam with an emission angle less than the first numerical aperture. A test head collects the light beam through the optical fiber to test the optical device. A method for positioning the optical fiber and testing the optical device is also disclosed.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 3 is a side view of a SiOB assembly under test showing an optical test fiber in place in accordance with the present invention;

FIG. 4 is an end view of the SiOB assembly of FIG. 3 showing the optical test fiber maintained without contact with SiOB (contact with SiOB may also be maintained) in accordance with the present invention;

FIGS. 7A and 7B show input and output graphs, respectively, for high speed measurements (e.g., 10 Gb/s) input and output pulses through an optical test probe in accordance with the present invention;

FIG. 8 is a schematic diagram of an AC optical test head for testing the output of an optical test probe in accordance with the present invention; and FIG. 9 is a schematic side view of an alternate coupling method for collecting light emitted from an optical device in accordance with the present invention;

DETAILED DESCRIPTION OF PREFERRED EMBODIMENTS

In accordance with the present invention, the next generation of higher data rate, multi-component, SiOB carriers will place laser diodes (LD) or other devices away from the edge of a larger SiOB chip carrier. This will make possible the populating of the SiOB with a LD chip, multiple optical passive components (e.g. fibers and lens), and integrated circuit (IC) signal processing chips (e.g. laser driver or photodiode amplifier ICs). This next generation SiOB may operate at data rates of around 10 Gb/sec or higher, making the electrical trace layout one important design consideration.

Previously, restrictions on the placement choice for the LD or a photodiode (PD) existed. During electrical testing, the electrical signals would be brought to the pads on the SiOB using high speed, large probes. The location of the LD on the SiOB and the presence of the large electrical drive probes would make it impossible to place photodetectors near the optical output of the laser chip. For efficient (low cost) testing, it is preferable to bring an optical beam collecting component near the optical output of the laser, quickly align it (within seconds) to the laser, and measure both DC and AC characteristics. It is also time efficient if there is only one manipulation of the optical and electrical probes near the SiOB before all measurements are made.

The present invention, permits measurements of optical devices from locations of a carrier which are not at or near the edge. For example, a laser may be located in the center of a SiOB where a socket and/or V-grooves are etched into the surface in front of the laser's optical output surface. In this way, greater flexibility is afforded to the layout of the carrier, permitting the use of many different components and permitting the carrier to be much larger in size.

The present invention provides an apparatus which uses a high NA, large core fiber optical test probe (OTP) to make high data rate measurements on an optoelectronic chip (such a LD) which is mounted away from the edge of a chip carrier so that it is difficult to sample the light beam.

One embodiment uses a SiOB as an opto-electric (OE) chip carrier, performs AC testing of a laser diode (e.g., in the range of 10 Gb/s or greater), takes advantage of the coarse alignment tolerance requirements, and allows rapid positioning of the OTP in front of the LD.

Figure 2:
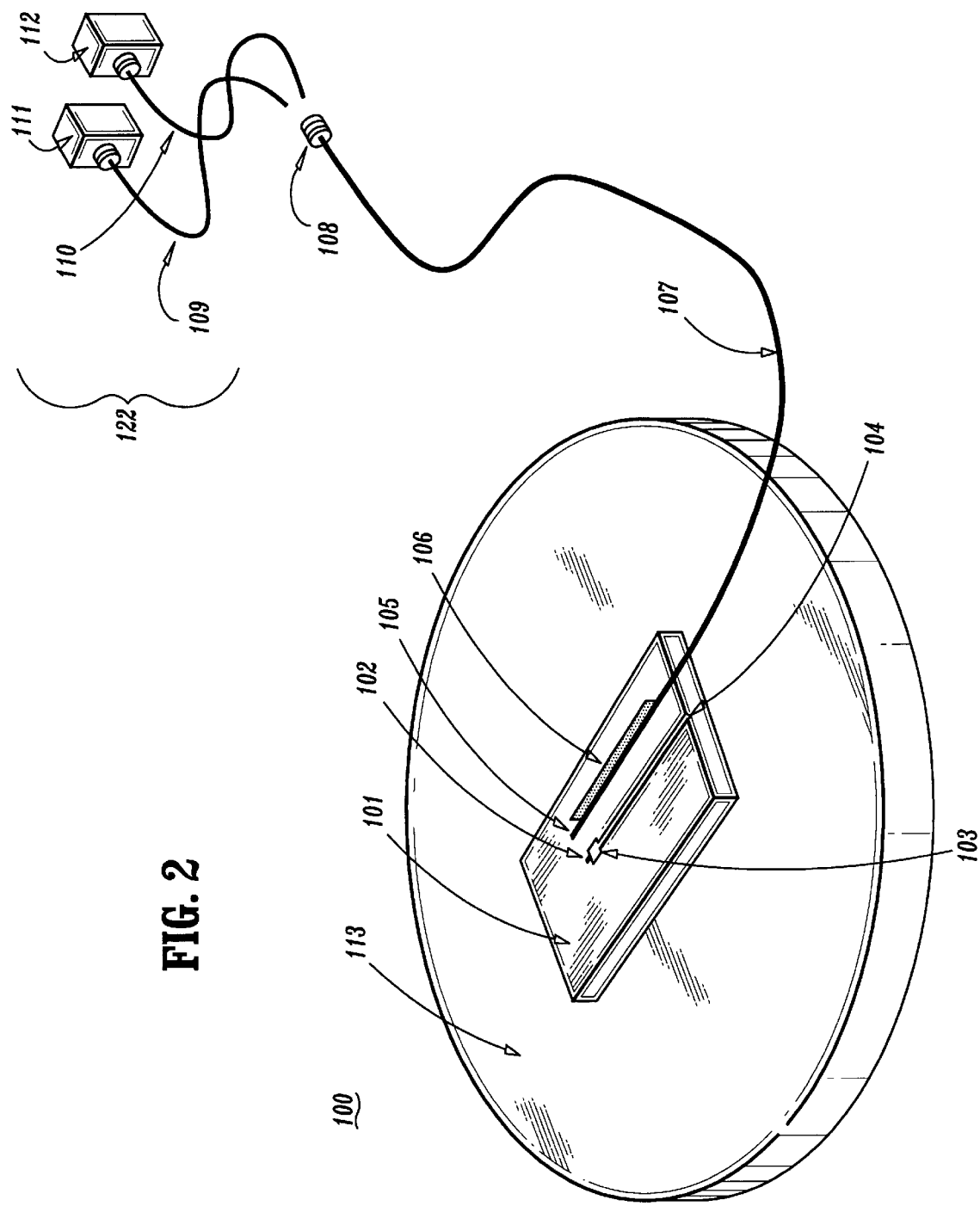
FIG. 2 is a perspective view of a test station in accordance with the present invention.

Referring now in detail to the figures in which like numerals represent the same or similar elements and initially to FIG. 2, a testing apparatus or station 100 is shown in accordance with an illustrative embodiment of the present invention. Testing station 100 for a Silicon Optical Bench (SiOB) assembly 101 includes a testing head station 113, where the SiOB 101 to be tested is placed. Testing head station 113 which supports SiOB 101 during testing. Testing station 100 includes electrical and optical probes. Testing equipment 122 may include a rack of equipment or devices for performing a plurality of electrical or optical tests. In preferred embodiments, testing equipment is located between about 1 meter to about 5 meters from the testing head 113. The distance between the test equipment 122 and the test head station 113 permits the test equipment to be shared with many test heads. The present invention provides an optical test probe (OTP) 107 to test optical devices (e.g., transmitters or receivers) mounted on SiOB 101.

SiOB 101 is the assembly to be tested, e.g., for AC and DC optical performance. This assembly may include one or more lasers 102, for example. There are electrical traces on the SiOB, connected to the laser (not shown). There are electrical probes connecting laser modulating test equipment to the electrical traces (not shown). A semiconductor laser (e.g., a laser diode (LD)) 102, preferably a laser chip, is mounted on the SiOB 101. For purposes of this disclosure LD 102 is the device to be tested. It is noted that other devices may also be tested in accordance with the present invention.

An etched socket 103 may be formed in the SiOB 101. Socket 103 may include any feature used to align a ball lens (not shown) or other devices to a light emitting region of LD 102. The ball lens or other device is inserted later in the SiOB assembly process. Socket or trench 103 provides a region of access to the device to be tested (e.g., LD 102).

An etched feature 104, such as a V-groove or slot, is formed in SiOB 101. Feature 104 is used to align a fiber (not shown) to the lens (not shown) after assembly of SiOB 101. This fiber is inserted later in the assembly process.

An input end portion 105 of OTP 107 includes a high numerical aperture (NA) fiber. Input end portion 105 is shown attached to a supporting structure 106 near the tip of OTP 107. Supporting structure 106 is attached to a mechanism that can quickly move OTP 107 in front of the LD chip 102 under test, and hold end portion 105 in position. Supporting structure 106 assures that the OTP 107 does not vibrate or move significantly during test. Supporting structure 106 may include a robotic arm or other apparatus which provides quick and accurate movement of OTP 107. Supporting structure 106 may be permanently attached to OTP 107 by an adhesive or the like. There are many possible implementations of how this fiber test probe 107 can be attached to probe support structure 106, which, in turn, can be rapidly inserted into the test station head. The specific implementation depends on the testing head design, as one skilled in the art would understand.

Optical test probe OTP 107 has its input end portion 105 placed in proximity with the LD 102 under test. OTP is preferably captured in a standard fiber cabling, which is flexible and protects the fiber against damage when handling. An output end of OTP cable 107 is terminated in a standard optical connector 108. Fiber-to-fiber connector 108 permits either an AC probe head 111 or a DC probe head 112 to be attached to the OTP 107 at fiber inputs 109 and 110, respectively, depending on the test to be performed. This connector 108 may be replaced with a 1–2 fiber switch, for example, if the test station is to be automated.

AC testing probe head 111 includes a fiber input, a photodiode to convert the optical signals to electrical signals, and electrical output leads. In a preferred embodiment, as illustratively shown in FIG. 8, probe 111 includes a lens 202 between photodiode 204 and the fiber 107 to improve the optical power coupled from the fiber 107 to photodiode 204. An electrical amplifier 206 is provided between photodiode 204 and output leads 208 to improve the signal to noise ratio of the electrical signal and impedance match the electrical signal output to the test equipment. Probe 111 may be assembled using well known practices in the optical test equipment industry.

Returning to FIG. 2 a DC testing head 112 includes a fiber input and a large photodetector (not shown) to collect all the fiber output power. The electrical output leads and the test equipment are similar to those shown in FIG. 8, except lens 202 is not needed and photodiode 204 is replaced with a large photodetector, as described below. In a preferred embodiment, there will also be an amplifier to improve the electrical signal to noise. Probe 112 may be assembled using well known practices in the optical test equipment industry.

Test station head 122 includes all the electrical probing fixtures, coarse alignment features for the assembly under test, support for microscopes or electrical cables, etc. These attachments are not shown since test station heads may be developed for a plurality of different test scenarios, as would be understood to those skilled in the art.

Referring to FIG. 3, in one preferred embodiment of the present invention, a large core, high numerical aperture, multi-mode fiber is employed for OTP 107 to gather a constant fraction of the light 125 from laser 102. OTP 107 is preferably brought into V-groove 104 and/or socket area 103, which has already been fabricated in the SiOB 101, directly in front of the laser 102. OTP 107 is quickly positioned in front of the laser 102 (because the light gathering fiber core of OTP 107 is much larger than the laser's output beam 125). The NA of OTP 107 is equal to or greater than the laser's output NA (e.g., emission angle), so that a constant fraction of the light is gathered from the laser with loose alignment tolerances, thus allowing quantitative measurements. Likewise, the core diameter of OTP 107 is larger than the spot size of laser beam 125 impinging on fiber 107. LD 102 and OTP 107 are aligned by a moveable fixture (supporting structure 106). As shown in FIG. 4, OTP 107 does not have to rest on SiOB 101 during testing.

This invention teaches that high NA fibers can be used to transmit high speed optical pulses over short distances, even if the incident light is off axis relative to the fiber. In one embodiment lateral off sets of 100 microns or more are permitted without coupling power loss (see e.g., FIG. 6A)

Figure 5:
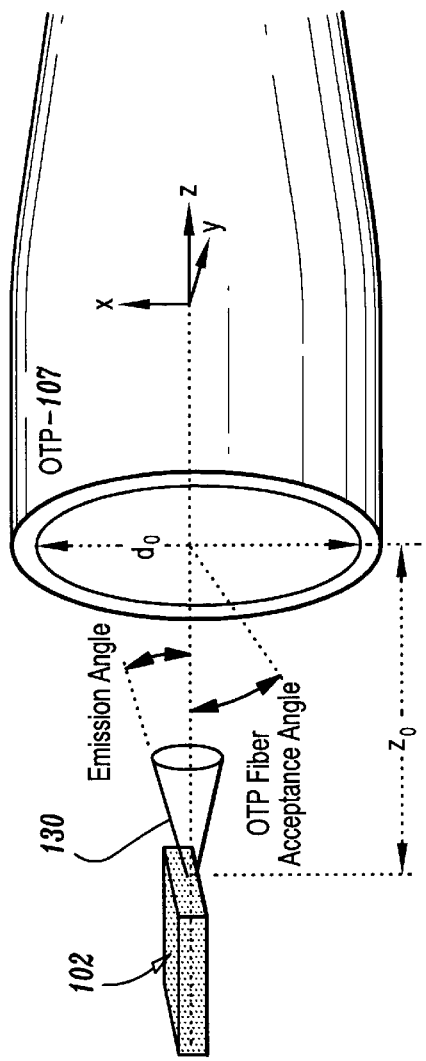
FIG. 5 is a schematic view of optical output beam properties with respect to an optical probe fiber input aperture in accordance with the present invention.

The characteristics of the OTP fiber 107 preferably include that the input numerical aperture (NA) is larger than the NA of the LD 102 being tested. A schematic drawing of the LD's light emission beam, and the OTP fiber light acceptance cross-section are shown in FIG. 5. An edge emitting LD, for example, has an asymmetric emission cone 130 in the plane perpendicular to the light beam propagation direction. In this case, the NA referred to is the largest NA from laser 102. The NA is defined as NA=sin θ, where θ in this example is the one half the angle emitted from the laser at which the power drops 14%, or the acceptance light-guided beam into the fiber. Other criteria may be employed. The diameter, $d_o$, requirement of the fiber light-guiding core is a function of (a) the NA of the laser and (b) the placement tolerance of the fiber arm with respect to the distance $z_o$ between a laser facet and an end of the fiber.

In particular, the diameter of the fiber core preferably satisfies the following relation:

$$d_o > 2z_o \times NA/sqrt(1-NA^2) \qquad \text{EQ. 1}$$

where NA is the numerical aperture of the laser and $z_o$ is the distance from the laser facet to the end of the fiber.

In one embodiment, OTP fiber 107 may have a partially graded index of refraction in the core that is the index of refraction is a function of radial position in the core. The fiber's outer diameter would be limited by the size of the grooves and sockets in the SiOB, and the desired handling characteristics (bend radius, etc. ) of the fiber itself.

For example, in testing an edge emitting DFB (distributed feedback) laser, the NA of LD 102 could be, say, approximately 0.35. The fiber 107 would have a numerical aperture of 0.39 (NA>0.35), and the fiber core diameter would be 200 microns in front of the LD end facet.

In preferred embodiments, the OTP fiber 107 of the present invention covers all fibers with A) diameters greater than or equal to 50 microns; and B) numerical apertures greater than 0.22.

Figure 6A:
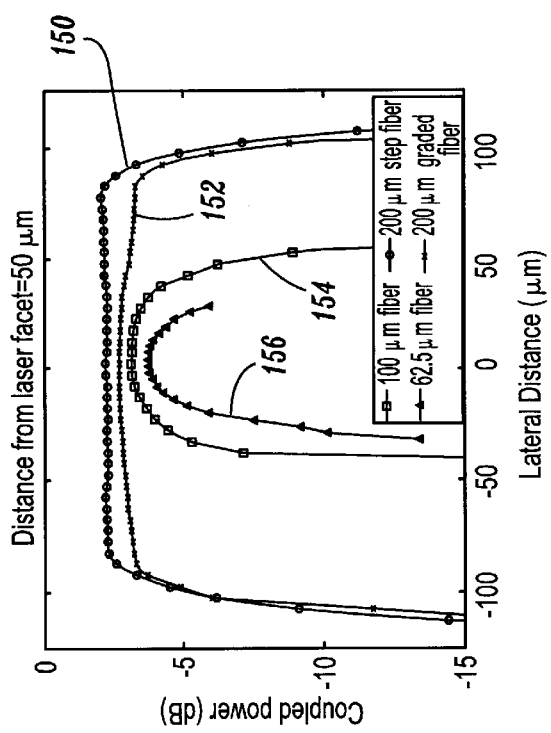
FIGS. 6A and 6B are plot of alignment tolerances (lateral distance (FIG. 6A) and longitudinal distance (FIG. 6B) between an optical test probe fiber and an optical device) and coupled power for different fiber types in accordance with the present invention.
Figure 6B:
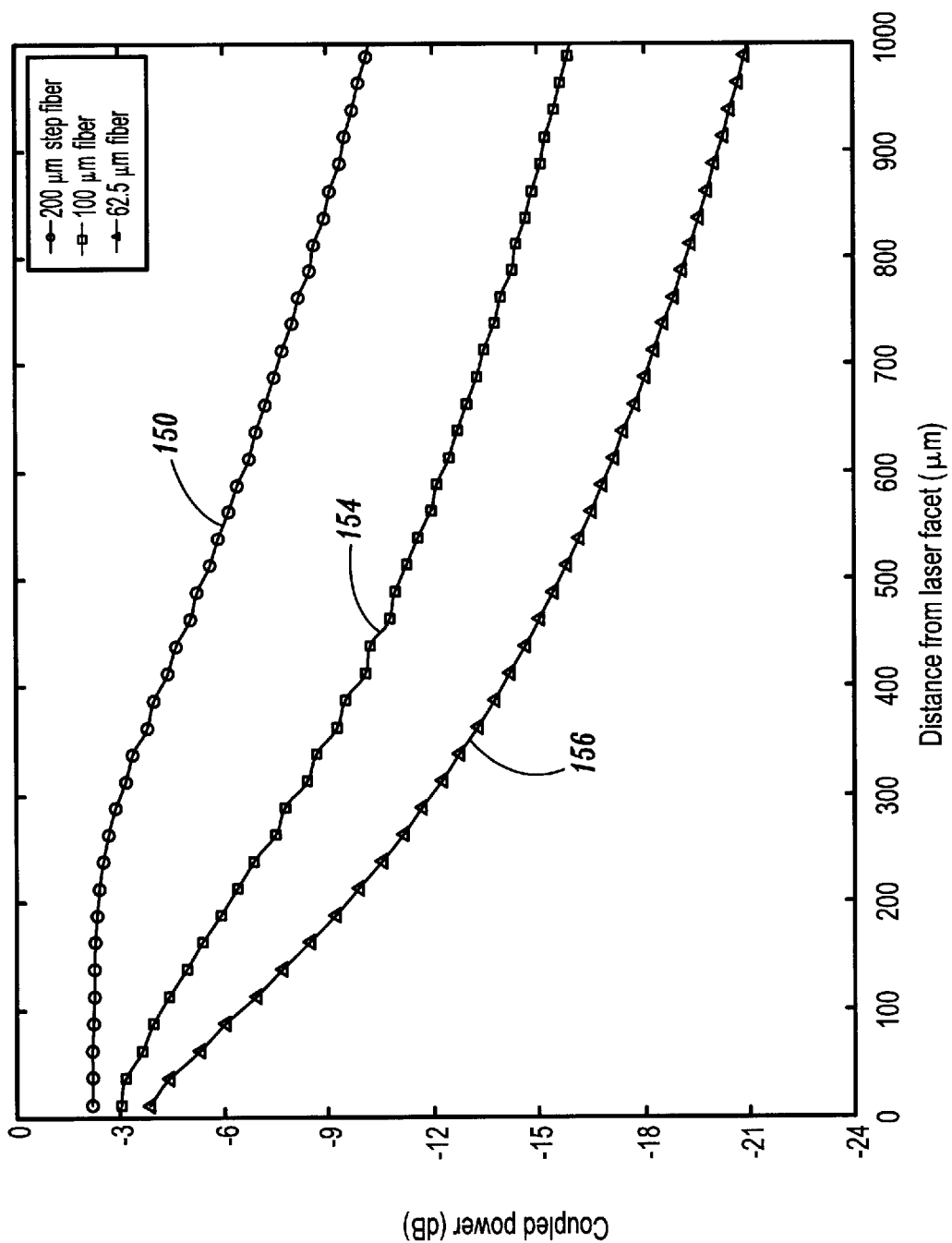

Referring to FIG. 6A, high coupling efficiency (e.g., over 60%) between LD 102 and OTP 107 is achieved in accordance with the present invention even with misalignments between LD 102 and OTP fiber 107, for the LD and fiber parameters of the example mentioned above. FIG. 6A shows coupled power versus lateral distance (x, y) for different fiber types at a fixed distance ($z_o$). FIG. 6B shows coupled power versus longitudinal distance at x=y=0 microns. Plot 150 shows data for a 200 micron diameter fiber with a stepped index of refraction. Plot 152 shows data for a 200 micron diameter fiber with a graded index of refraction, illustrating a large tolerance in x-y misalignment with constant coupled light power. This provides high throughput testing. Plot 154 shows data for a 100 micron diameter fiber with less misalignment tolerance. Plot 156 shows data for a 62.5 micron diameter fiber with even less misalignment tolerance.

Referring to FIGS. 7A and 7B, after the OTP fiber 107 leaves the test head region 113 (FIG. 2) of the test station 100, OTP fiber 107 is cabled like a standard fiber cable and routed over to the test equipment 122 (e.g., a distance of less than about 3 meters). FIGS. 7A and 7B respectively show the input and output pulse of the example OTP fiber 107, after 10 meters of transmission, when a 10 Gb/sec data pulse is sent through the OTP fiber 107.

For example, at 10 Gb/sec data pulse testing, a large core fiber whose bandwidth distance product is 30 MHz*km, can be used for distances up to 2 m. For 40 Gb/s components, a fiber with 120 MHz*km needs to be selected to achieve the same distance. In practice, this means that graded index large core fibers are preferred for this purpose.

Figure 1:
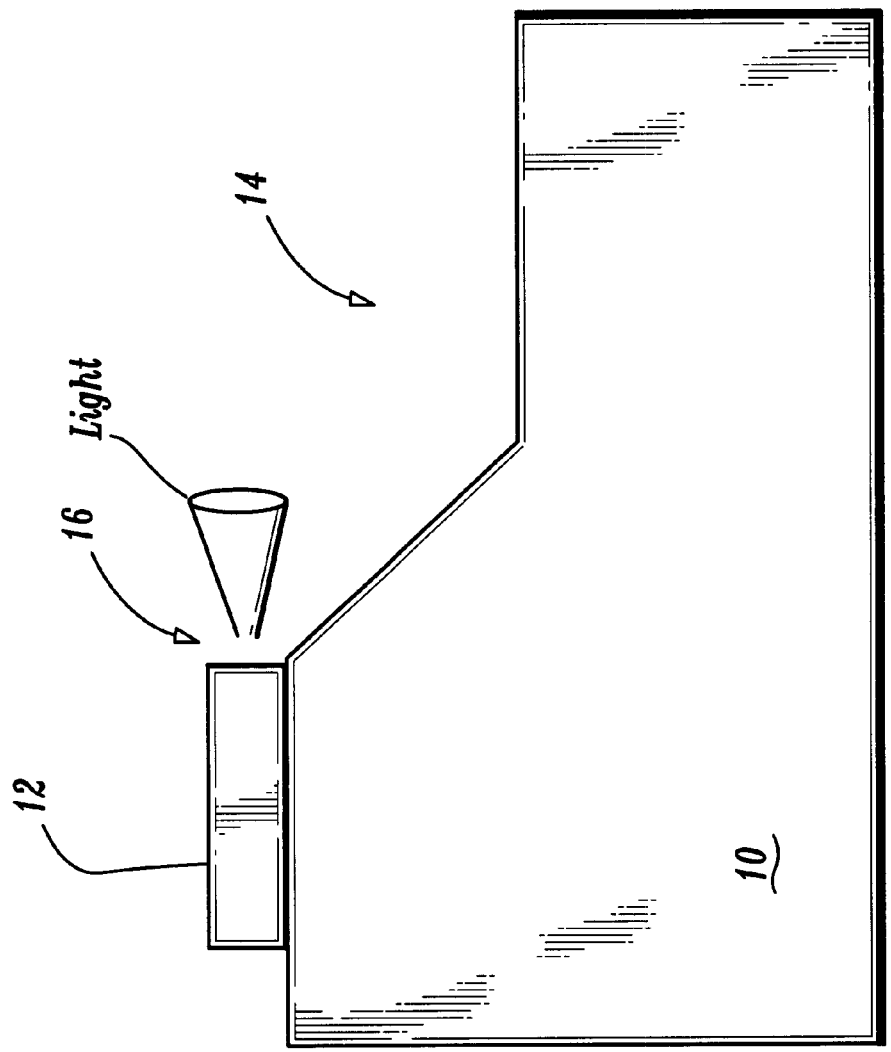
FIG. 1 is a conventional silicon optical bench (SiOB) with an electro-optical device near the edge of the bench to provide access to the electro-optical device.

Referring to FIG. 8, fibers 109 and 110 of test head 122 (FIG. 1) are attached to connector 108, depending on whether AC, DC or other tests are to be done. The fibers of test heads 109 and 110 are preferably the same type as the fiber used for OTP 107.

For high data rate (e.g., greater than or equal to 10 Gb/s) testing, photodiodes with active area dimensions smaller than the fiber core of OTP 107 are preferably used. In one case, lens 202 is disposed between photodiode 204 and the fiber 107 to improve the optical power coupled from the fiber 107 to photodiode 204. An electrical amplifier 206 is provided between photodiode 204 and output leads 208 to improve the signal to noise ratio of the electrical signal and impedance match the electrical signal output to the test equipment. Lens 202 is employed to refocus the light to a small diameter photodiode 204 (e.g., about 30 microns). For DC tests, this would be replaced with a large area DC photodetector and no lens. Note that the set up at the test head of the fiber is not disturbed in this change from AC to DC testing.

In one preferred embodiment, optimized for the highest test station throughput, the fibers 107, 109, and 110 (FIG. 2) would be connected through a programmable fiber switch box, so that AC and DC testing could be automated. These boxes are known in the optical test industry. However, in some embodiments the connections would be made manually, and in other embodiments there would only be one test head needed for both AC and DC measurements.

Referring to FIG. 9, another embodiment includes an OTP fiber 107 having an optical beam turning element (e.g., mirror) 302 for redirecting light to redirect the beam from LD 102 (or other device) to the OTP fiber 107. There may also be a collimation or focusing optics 304 around the beam turning element, such as, e.g., a ball lens at the input, as shown in FIG. 9. Mirror (302) and ball lens (304) may be attached to OTP 107 by adhesive or glue 306, for example.

The embodiments for moving the OTP fiber 107 onto the test head and back off are specific to particular test equipment. A plurality of different mechanisms or fixtures may be employed to hold and position OTP 107 in accordance with the present invention. OTP 107 is preferably maintained substantially perpendicular (e.g., +/−20 degrees relative to the light propagation direction or a major surface of SiOB 101) to the direction of propagation of the light beam form device 102. Any combination of angle of OTP 107 is possible provided mirror 302 is operatively positioned to provide light into fiber 107.

It is to be understood that the embodiments described are illustrative for use with transmitter and/or receiver SiOB's similar principles can be applied to other optical and electro-optical devices. In addition, coupling an OTP fiber to small photodetection surface area, fast detectors or to large area, slow photodetectors, using passive optical elements, is known in the art. The present invention permits the positioning of optical devices throughout the layout of a SiOB or other substrates or permits the positioning of optical devices next to the edge of a chip carrier, which may be secured on the SiOB or substrate.

Having described preferred embodiments of an optical test probe for silicon optical bench (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An optical testing device, comprising:
   an optical fiber having a first numerical aperture at a first end of the optical fiber;
   a positioning structure attached to the optical fiber for moving the first end of the optical fiber to any portion of a substrate for testing at least one optical device disposed at any location on the substrate, the at least one optical device for providing a light beam with an emission angle less than the first numerical aperture; and
   a test head which collects the light beam through the optical fiber and tests both AC and DC properties of the at least one optical device.

2. The testing device as recited in claim 1, wherein the optical fiber includes a multi-mode fiber with a core diameter larger than a spot size of the light beam emitted from the at least one optical device.

3. The testing device as recited in claim 1, wherein the first numerical aperture is greater than or equal to 0.22.

4. The testing device as recited in claim 1, wherein the optical fiber includes a graded index.

5. The testing device as recited in claim 1, wherein the substrate includes a silicon optical bench.

6. The testing device as recited in claim 1, wherein the substrate includes an opening adjacent to a light-emitting region of the at least one optical device the opening permitting access to the at least one optical device to permit collection of the light beam.

7. The testing device as recited in claim 6, wherein the opening includes a lens socket formed in the substrate.

8. The testing device as recited in claim 6, wherein the opening includes a v-groove formed in the substrate.

9. The testing device as recited in claim 1, wherein the at least one optical device includes a laser.

10. The testing device as recited in claim 1, wherein the positioning structure supports the optical fiber such that no contact is made with the substrate during testing.

11. The testing device as recited in claim 1, wherein the optical fiber includes a beam turning element for redirecting the light beam.

12. The testing device as recited in claim 11, wherein the optical fiber includes an optical element for focusing or collimating the light beam.

13. The testing device as recited in claim 11, wherein the optical fiber includes a longitudinal axis, the longitudinal axis being disposed transversely to a propagation direction of the light beam.

14. A method for testing an optical device mounted on a substrate, comprising the steps of:

providing a testing device including an optical fiber having a first numerical aperture at a first end of the optical fiber, a positioning structure attached to the optical fiber, the optical device for providing a light beam with an emission angle less than the first numerical aperture;

positioning the optical fiber in a light path of the optical device by employing the positioning structure to place the first end of the optical fiber at any position on the substrate to collect light emitted from the optical device; and collecting the light emitted from the optical device through the optical fiber at a test head to test the optical device.

15. The method as recited in claim 14, wherein the optical fiber includes a multi-mode fiber.

16. The method as recited in claim 14, wherein the first numerical aperture is greater than or equal to 0.22.

17. The method as recited in claim 14, wherein the optical fiber includes a graded index.

18. The method as recited in claim 14, wherein the substrate includes a silicon optical bench.

19. The method as recited in claim 14, wherein the substrate includes an opening adjacent to a light-emitting region of the optical device, and wherein the step of collecting includes permitting access to the light path of the optical device through the opening to permit collection of the light beam.

20. The method as recited in claim 19, wherein the opening includes one of a lens socket and a v-groove formed in the substrate.

21. The method as recited in claim 14, wherein optical device includes a laser.

22. The method as recited in claim 14, wherein the step of positioning includes maintaining the optical fiber at a distance from the substrate such that no contact is made with the substrate during testing.

23. The method as recited in claim 14, wherein the step of positioning the optical fiber in a light path includes redirecting the light beam into the optical fiber by providing a beam turning element.

24. The method as recited in claim 23, further comprising the step of focusing or collimating the light beam by providing an optical element on the first end.

25. The method as recited in claim 14, wherein the step of positioning the optical fiber in a light path of the optical device includes the step of positioning a longitudinal axis of the optical fiber transversely to a propagation direction of the light beam.

26. The method as recited in claim 14, wherein the step of positioning the optical fiber in a light path includes providing a tolerance for lateral distance between the optical fiber and the optical device of about 100 microns or greater.

* * * * *